Feb. 27, 1940.        D. D. ROBERTSON          2,191,542
                      VACUUM TUBE CIRCUITS
                      Filed Dec. 15, 1937
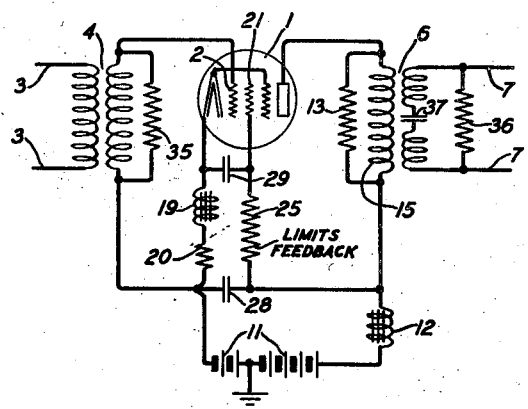
INVENTOR
D. D. ROBERTSON
BY
ATTORNEY Patented Feb. 27, 1940

2,191,542

UNITED STATES PATENT OFFICE 2,191,542

VACUUM TUBE CIRCUITS

Donald D. Robertson, Hartsdale, N. Y., assignor to Bell Telephone Laboratories, Incorporated, New York, N. Y., a corporation of New York Application December 15, 1937, Serial No. 179,842

7 Claims. (Cl. 179—171)

This invention relates to circuits for electric space discharge devices, as, for example, vacuum tube amplifiers employing retroaction or feedback.

An object of the invention is to facilitate provision of proper feedback voltages and grid biasing voltages in such circuits, as, for example, suitable negative feedback and negative biasing voltages for a control grid of a vacuum tube and a suitable positive voltage for an auxiliary grid, for instance, a screen grid or a space charge grid.

In one specific aspect the invention is a vacuum tube amplifier with a cathode lead inductance giving negative feedback and bias, and with a resistance-capacity screen grid filter whose resistance is sufficiently low to limit the feedback voltage.

The single figure of the drawing is a circuit diagram of an amplifier embodying such form of the invention.

The amplifier comprises a suppressor grid pentode tube 1 for amplifying speech or other signal waves supplied to the control grid 2 of the tube from incoming line or circuit 3 through input transformer 4 and transmits the amplified waves through output transformer 6 to outgoing line or circuit 7.

Plate voltage for the tube is supplied from battery 11. Plate current for the tube passes from the positive terminal of the battery through choke coil 12 and thence through two branch circuits to the plate. One of these branch circuits includes resistor 13 and the other includes the primary winding 15 of transformer 6. This current passes from the plate through the tube to the cathode and then through choke coil 19, and resistor 20 to the negative pole of the battery.

Voltage for maintaining the screen grid 21 of the tube at the proper positive potential (with respect to the cathode) is supplied from the battery 11 through the choke coil 12 and a resistance 25 which may have a value of 3000 ohms, for example. Condensers 28 and 29 are by-pass condensers of low reactance for alternating current.

The alternating current output circuit of the tube extends from the cathode through two branch circuits, one including coil 19, resistance 20 and condenser 28 in series and the other including condenser 29 and resistance 25 in series, and thence extends through the branches 13 and 15 to the plate.

Resistance 20 permits the space current of the tube to be ascertained by measurement of the voltage across this resistance, and thus is useful in testing the thermionic activity of the cathode of the tube. This resistance may be omitted if desired. If used, it may have a value of 15 ohms, for example, as compared to a direct current resistance of, for example, 515 ohms for the chock coil 19.

The voltage across coil 19 (and resistance 20, if used) due to flow of plate and screen direct currents therethrough supplies negative grid biasing potential for the control grid 2.

The voltage across coil 19 (and resistance 20, if used) due to flow of alternating current therethrough produces negative or gain-reducing feedback in the tube. Negative feedback is advantageous, for example, for reducing the modulation and noise in the amplifier and increasing its gain stability, (as pointed out in the paper by H. S. Black on Stabilized feedback amplifiers, Electrical Engineering, January 1934, pages 114 to 120, and in H. S. Black Patent 2,102,671, December 21, 1937), and the voltage amplification for propagation once around the feedback loop may be of a larger order of magnitude than unity, for obtaining large modulation reduction or gain stability, (as pointed out in the paper and the patent just mentioned). The feedback may reduce the gain of the amplifier, for example, by approximately 18 decibels.

Especially when the feedback voltage developed across coil 19 is large, it is often desirable to prevent application of this voltage to the screen grid 21. The condenser 29 is useful for this purpose, tending to maintain the screen grid 21 at the potential of the cathode, as regards alternating potentials. The resistance 25 has a value sufficiently large to prevent undue lowering of the feedback voltage across the impedance 19, 20, due to shunting effect or short-circuiting effect exerted upon that impedance by elements 29, 25, 28 of the circuit for supplying steady screen grid potential. However, in accordance with the invention, resistance 25 is given a value sufficiently low to materially reduce the feedback voltage across the impedance 19, 20 for the frequencies of the waves to be amplified, so the feedback voltage and the amount of feedback are limited to desired values. For example, where the tube is a Western Electric Company's 311–A type of tube and the signals are speech currents, the impedance of coil 19 may be, for instance, approximately $+j\,62000$ ohms at a frequency of 1000 cycles per second, and may be, for instance, approximately $+j\,15000$ ohms at a frequency of 250 cycles per second; and then the value of resistance 25 may be, for instance, approximately 3000 ohms, and the direct current resistance of coil 19 may be, for instance, approximately 515 ohms. Then the impedance of resistance 25 is only about a fifth as large as that of coil 19 at 250 cycles, and only about a twentieth as large as that of coil 19 at 1000 cycles. The high alternating current impedance of the coil, as compared to its direct current resistance, is of value in obtaining a large amount of feedback without producing too great negative bias on the control grid; and with the value of the resistance 25 sufficiently low, the total feedback impedance, (i. e., the impedance of the circuit consisting of the path 19, 20 and the path 29, 25, 28 in parallel), and consequently the amount of feedback and its variation over the transmission frequency range of the amplifier, is limited and prevented from becoming excessive.

Resistance 35 assists the transformer 4 in giving the amplifier input impedance, with feedback, a value that matches the impedance of circuit 3.

Resistances 13 and 36 and condenser 37 cooperate with transformer 6 in giving the amplifier output impedance, with feedback, a value that matches the impedance of circuit 7, the condenser resonating with the mutual inductance of the transformer at a frequency in the neighborhood of the lower edge of the frequency range used, to annul that inductance and lower the inductive component of the amplifier output impedance for frequencies above the resonance frequency.

The circuit, not shown, for supplying current to the cathode-heating element of the tube may be of any suitable type, the heater current being obtained, for example, from the portion of battery 11 between the negative pole and ground.

What is claimed is:

1. A wave translating system comprising an electric space discharge tube having an anode, a cathode, a control grid and a screen grid, a source of space current for said tube, a cathode-anode alternating current circuit for said tube, a cathode-control grid circuit for said tube, an inductance common to said circuits traversed by alternating space current of said tube for supplying to said control grid negative biasing voltage and negative feedback voltage, a resistance having one end connected to said screen grid and the other end connected to a point of positive potential on said space current source, and a condenser connecting said cathode to a point on said resistance remote from said other end, said resistance having a value sufficiently small to limit said feedback voltage.

2. A wave translating system comprising an electric space discharge device having an anode, a cathode, a discharge control grid, a second grid, a cathode-anode alternating current circuit and a cathode-control grid circuit, a path comprising an inductance carrying alternating space current of said tube common to said circuits for causing an alternating voltage to form across said path, a second path shunting said first path, said second path comprising a capacity and a resistance in series, with said capacity connected between said cathode and said resistance, and means connecting said second grid to a point on said second path between said capacity and said resistance, said second path having impedance sufficiently small to materially reduce the alternating voltage across said first path.

3. In a wave translating system, a screen grid tube, a space current supply source therefor, a path for alternating space current of said tube including an inductance connected between the tube cathode and the negative pole of said source for causing an alternating voltage to form across said inductance, a connection including a resistance between the screen grid and a point of positive potential on said source, and a capacity connecting the cathode to the end of said resistance remote from said point, the impedance of said resistance being lower than that of said inductance at the highest frequency to be translated.

4. A wave translating system comprising a multigrid space discharge tube having an anode-cathode alternating current path, an inductance in said path, a circuit comprising said inductance connecting the cathode to one of the grids, a second circuit comprising a resistance and said inductance in serial relation connecting the cathode to another of the grids, and a capacity of low reactance for frequencies of the waves to be translated connected across a portion of said second circuit including said inductance and said resistance, said resistance having impedance low compared to that of said inductance for said frequencies.

5. A wave translating system comprising a vacuum tube having an anode, a cathode, a control grid, a screen grid, an alternating current circuit connecting said cathode and said anode, a circuit connecting said cathode and said control grid, an inductance common to said circuits carrying alternating space current of said tube for developing alternating voltage across said inductance, a resistance having impedance small compared to that of said inductance at a frequency of a wave to be translated in said system, a path connecting said cathode and said screen grid and including said inductance and said resistance in serial relation, and a condenser connected across said path.

6. An electric space discharge device having an anode, a cathode, and two discharge control elements, a path having one end connected to said cathode and including inductance and resistance effectively in series traversed by space current of said device producing alternating and direct voltages in said path, means feeding to one of said discharge control elements said alternating and direct voltages, a second path including a condenser connecting said one end of said first path to said other discharge control element, and a third path including a resistance connecting a point on said first path at the opposite side of said inductance and resistance from said one end of said first path to the terminal of said condenser remote from said one end of said first path, said third path having its alternating current impedance sufficiently small to materially reduce said alternating voltage produced in said first path.

7. A wave amplifying system comprising a vacuum tube having an anode, a cathode, a control grid and an auxiliary grid, an anode-cathode alternating current path for said tube, a circuit comprising an inductance in said path for developing alternating voltage across said inductance, a space current supply source for said tube, a resistance and a condenser, said inductance, source, resistance and condenser being all in serial relation, with said source connected between one end of said inductance and one end of said resistance and with said condenser connected between the other end of said inductance and the other end of said resistance, a connection to said cathode from a point on said circuit between said inductance and said capacity, a connection to said auxiliary grid from a point on said circuit between said capacity and said resistance, and means for supplying alternating and direct potentials to said control grid from a portion of said circuit including said inductance, said resistance having a value less than the impedance of said inductance at the highest frequency of the waves to be amplified by said system.

DONALD D. ROBERTSON.